US011036062B2

(12) United States Patent
Hansen (10) Patent No.: US 11,036,062 B2
(45) Date of Patent: Jun. 15, 2021

(54) DISPLAY WITH PARALLAX BARRIERS

(71) Applicant: Panasonic Automotive Systems Company of America, Division of Panasonic Corporation of North America, Peachtree City, GA (US)

(72) Inventor: Nicholas Brian Hansen, Fayetteville, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 179 days.

(21) Appl. No.: 16/189,380

(22) Filed: Nov. 13, 2018

(65) Prior Publication Data

US 2019/0243151 A1 Aug. 8, 2019

Related U.S. Application Data

(60) Provisional application No. 62/625,504, filed on Feb. 2, 2018.

(51) Int. Cl.
*G02B 30/27* (2020.01)
*G09G 5/14* (2006.01)
(Continued)

(52) U.S. Cl.
CPC ......... *G02B 30/27* (2020.01); *G02B 27/0093* (2013.01); *G02B 27/0101* (2013.01);
(Continued)

(58) Field of Classification Search
CPC ............... G02B 30/27; G02B 27/0093; G02B 27/0101; G02B 2027/0181; G09G 5/14;
(Continued)

(56) References Cited

U.S. PATENT DOCUMENTS

| 2011/0159929 | A1* | 6/2011 | Karaoguz | H04N 13/341 455/566 |
| 2012/0320171 | A1* | 12/2012 | Lee | H04N 13/373 348/54 |
| 2016/0065936 | A1* | 3/2016 | Jang | H04N 13/128 348/55 |

OTHER PUBLICATIONS

Ashcraft, B., Kotaku East: Testing Out The New Nintendo 3D's Head Tracking, https://kotaku.com/testing-out-the-new-nintendo-3dss-head-tracking-1646040641, Oct. 14, 2014.
(Continued)

*Primary Examiner* — Jade R Chwasz
(74) *Attorney, Agent, or Firm* — Laurence S. Roach, Esq.

(57) ABSTRACT

Examples of the present disclosure relate to a device, method, and medium storing instructions for execution by a processor for displaying multiple images. In an example, a device may include a display to present two images interleaved, where the display includes a vertical axis parallel to a line passing through a center-bottom of the display and a center-top of the display. The device includes a first parallax barrier placed between the display and an intended viewable area, where the first parallax barrier includes a first number of parallax barrier lines, where the first number of parallax barrier lines are opaque and parallel to the vertical axis. The device includes a second parallax barrier placed between the first parallax barrier and the intended viewable area, where the second parallax barrier includes a second number of parallax barrier lines, where the second number of parallax barrier lines are opaque and parallel to the vertical axis.

27 Claims, 8 Drawing Sheets

(51) Int. Cl.
| | |
|---|---|
| *G09G 5/38* | (2006.01) |
| *G09G 3/00* | (2006.01) |
| *G02B 27/00* | (2006.01) |
| *G02B 27/01* | (2006.01) |
| *G02B 30/20* | (2020.01) |

(52) U.S. Cl.
CPC ............. *G02B 30/20* (2020.01); *G09G 3/001* (2013.01); *G09G 5/14* (2013.01); *G09G 5/38* (2013.01); *G02B 2027/0181* (2013.01); *G09G 2320/028* (2013.01); *G09G 2340/0471* (2013.01)

(58) Field of Classification Search
CPC .. G09G 5/38; G09G 3/001; G09G 2340/0471; G09G 2354/00; G09G 2340/0421; G09G 2340/045; G09G 2358/00; G09G 2320/028; G09G 3/20
See application file for complete search history.

(56) References Cited

OTHER PUBLICATIONS

Huang, F.C., Ph.D. Student, UC Berkley, Parallax Barrier Display (Pinhole), http://displayblocks.org/diycompressivedisplays/parallax-barrier-display/ , 2018.
http://en.wikipedia.org/wiki/Parallax_barrier, Wikipedia, Oct. 1, 2018.

* cited by examiner

DISPLAY WITH PARALLAX BARRIERS

CROSS-REFERENCED TO RELATED APPLICATIONS

This application claims benefit of U.S. Provisional Application No. 62/625,504 filed on Feb. 2, 2018, which the disclosure of which is hereby incorporated by reference in its entirety for all purposes.

FIELD OF THE INVENTION

The present disclosure generally relates to a method, system, and device for multiple image display. More specifically, the present disclosure relates to displaying multiple images to different people using the same display and parallax barriers.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

A display, including a display for a vehicle, may display relevant information to a person. While a display may show many types of information, in the context of a vehicle, a display may be useful for displaying driving directions, information about the vehicle, entertainment, driving condition alerts, and provide an interface for interactivity by a driver, passenger or other occupant of the vehicle. Displays currently display one image at a time on the same screen space. In some examples, displays may divide a display into two or more segments and display a first continuous image on one segment of the display and a second continuous image on second segment of the display, however this can reduce the overall display space for each displayed image. Displays also tend to favor displaying images for the needs of the driver for purpose of safety and functionality of operating the vehicle. During times where functions are overtaking the display a passenger or second viewer cannot view a second image on the same display.

SUMMARY

Generally, a device for displaying multiple images is presently disclosed. The device can include a display to present two images interleaved, where the display includes a vertical axis parallel to a line passing through the center-bottom of the display and the center-top of the display. The display further includes a first parallax barrier placed between the display and an intended viewable area, where the first parallax barrier includes a first number of parallax barrier lines, where the first number of parallax barrier lines are opaque and parallel to the vertical axis. The display further includes a second parallax barrier placed between the first parallax barrier and the intended viewable area, where the second parallax barrier includes a second number of parallax barrier lines, where the second number of parallax barrier lines are opaque and parallel to the vertical axis.

A method for displaying multiple images on a single display is also disclosed that can present two images interleaved through a display with a vertical axis parallel to a line passing from the center-bottom of the display and the center-top of the display. The method further includes generating a first parallax barrier located between the display and an intended viewable area, where the first parallax barrier includes a first number of parallax barrier lines, where the first number of parallax barrier lines are opaque and parallel to the vertical axis. This method may also block a second portion of the display with a second parallax barrier located between the first parallax barrier and the intended viewable area, where the second parallax barrier includes a second number of parallax barrier lines, where the second number of parallax barrier lines are opaque and parallel to the vertical axis.

In another example, a tangible, non-transitory, computer-readable medium can include instructions that, when executed by a processor, direct the processor to display multiple images on a single display. The instructions may include directions that instruct a processor to present two images interleaved through a display including a vertical axis parallel to a line passing from the center-bottom of the display and the center-top of the display. The instructions may also be executed to block a portion of the display with a first parallax barrier located between the display and an intended viewable area, where the first parallax barrier includes a first number of parallax barrier lines, where the first number of parallax barrier lines are opaque and parallel to the vertical axis. Additionally, these instructions, when executed, may block a second portion of the display with a second parallax barrier located between the first parallax barrier and the intended viewable area, where the second parallax barrier includes a second number of parallax barrier lines, and where the second number of parallax barrier lines are opaque and parallel to the vertical axis.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

The present disclosure describes a display that uses interleaving to slice two different images and alternate their display order. One or more parallax barriers over the display may be used to block parts of the display to show an apparent first image to first viewer location and a second image to a second viewer location. This is made possible by the angular difference between a first viewer position and second viewer position relative to the display. This angular difference combined with parts of a viewing path blocked by the presence of the parallax barrier is such that to the first viewer in a first position can see every other slice of the display's pixels while the remaining slices can be seen by the second viewer in a second position.

The parallax barrier may be placed in front of the display or other images source, to allow it to show a stereoscopic or multiscopic image without the need for the viewer to wear 3D glasses. The display can be a liquid crystal display (LCD) or display. The parallax barrier may also be an LCD. However, the LCD for the parallax barrier includes transparent and opaque regions that are adjustable in location and width. Relative to the viewer of the display, a parallax barrier is placed between the display and the viewer. For example, a parallax barrier may be placed in front of the normal LCD display, and the parallax barrier may consist of an opaque layer with a series of precisely spaced slits, allowing each viewer to see a different set of pixels on the display, thus allowing two pictures to be displayed to two different angles through parallax. Use of a single parallax barrier may limit the locations two viewers can move to while still observing this effect. This limitation may occur because while viewers most often will move independently from one another, the location and width of the single parallax barrier changes the angle and viewability of the display to both viewers simultaneously to equal and opposite degrees. Accordingly, the use of one parallax barrier would result in the display of two images to both users as intended if the users moved in equal and opposite ways at the same time, and may result in an erroneous presentation of images if one user moved at a different angle than the second user. In some situations a single parallax barrier may be acceptable such as in situations that has consistently fixed viewer locations that happen to be symmetrical about a plane perpendicular to the screen and through the line between the center top and center bottom of the screen. Accordingly, an example, includes a device for displaying multiple images, including a display to present two images interleaved, where the display includes a vertical axis parallel to a line passing through a center-bottom of the display and a center-top of the display. This device may have a single a parallax barrier placed between the display and an intended viewable area, where the first parallax barrier includes a first number of parallax barrier lines, where the first number of parallax barrier lines are opaque and parallel to the vertical axis.

Use of a second parallax barrier with the first parallax barrier allows the adjustment of an angle of two different images for two different viewers at a number of angles and locations relative to the display. The use of two parallax barriers can be supplemented by the use of face-tracking to adjust the relative viewable positions of certain pixels based on the location of the barrier slits, i.e. areas of transparency, according to the location of the viewer. The location of the viewer may be obtained by a sensor detection weight in a seat of a car, through the identification of a face or eyes from a camera sensor, from a heat signature, or from a motion or proximity detection. Further, the parallax barriers may be stacked and adjustable to allow variance in the angle of viewability of the images based on the angle and location of the viewers. The use of the second parallax barrier enables the adjustment of the viewable angle to one viewer without affecting the angle of display to the other viewer.

As discussed above, the display may be located in a vehicle and the display may be showing a different image to a driver and a passenger. In another example, the display may be for two passengers, such as showing different information or entertainment to two different viewers. In another example, the context may not be in a car but for a two person video game where each viewer may be shown their screen while the first viewer and second viewer are in different locations. In another example, the context may be for a student and a teacher where the teacher in one position may be shown a teaching view with answers or steps of a problem to be discussed while the students see the questions.

Figure 1:
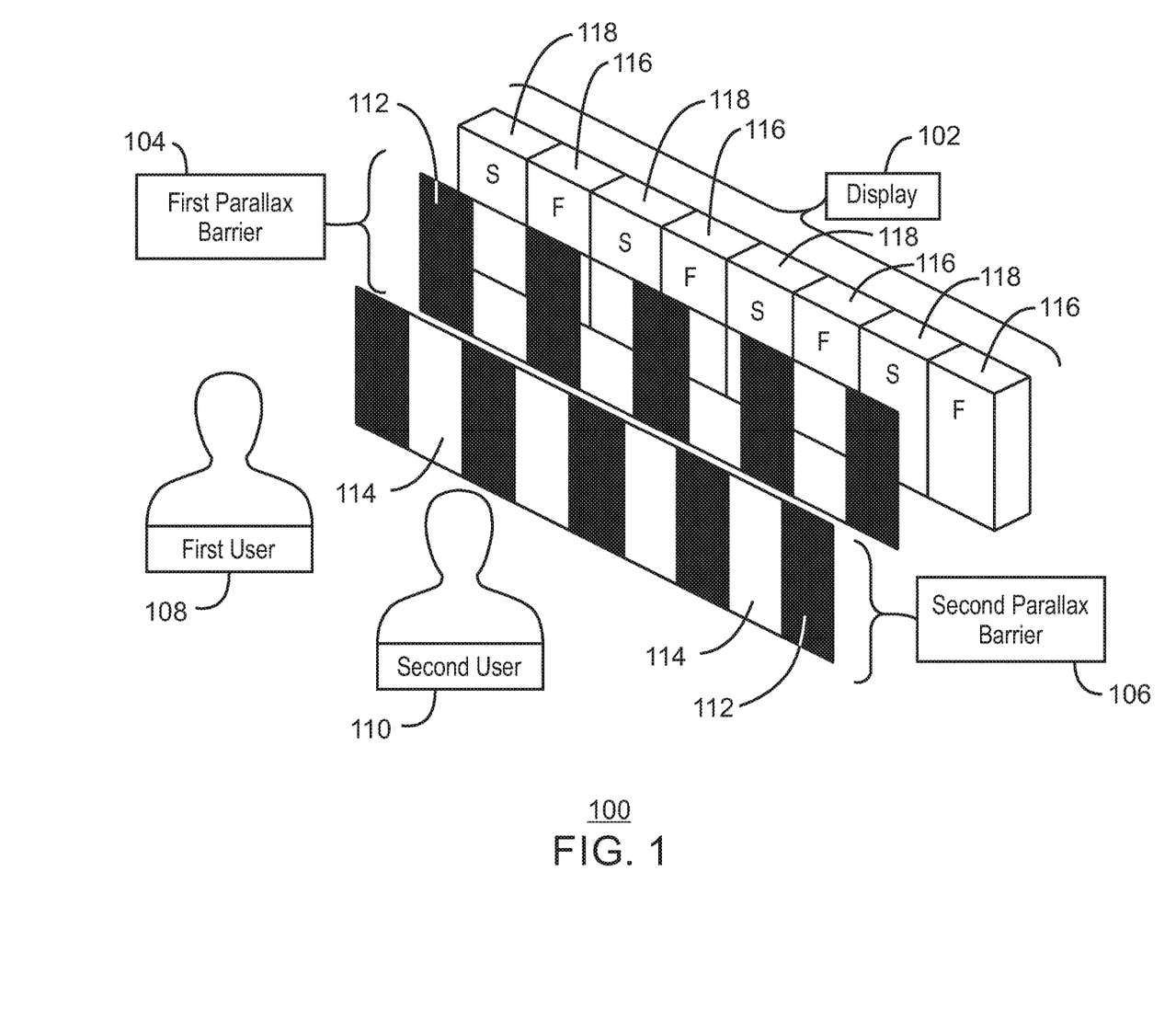
FIG. 1 is a drawing of an example schematic diagram of the display, barriers, and viewers.

FIG. 1 is a drawing of an example schematic diagram 100 of the display, barriers, and viewers. The display 102 may be an LCD screen or other screen that may show two or more interleaved images. The display 102 may be associated with a first parallax barrier 104 and a second parallax barrier 106. Together with the parallax barriers, the display 102 may be viewed as a single parallax barrier driven autostereoscopic display to be used for two or more viewers. Parallax barriers are barriers that have alternating opaque and transparent areas that allow blocking of the interleaved portions of one of the images or the other, based on the direction that the display is viewed from. The first parallax barrier 104 may be closer to the display 102 relative to the second parallax barrier. The second parallax barrier 106 may be on the same side of the display 102 as the first parallax barrier 104 in the direction of an intended viewable area. The first viewer 108 and the second viewer 110 may occupy the intended viewable area. The first viewer 108 and the second viewer 110 may be located so that they can see through the first parallax barrier 104 and the second parallax barrier 106.

Each parallax barrier is made to alternately have regions of opacity 112 and regions of transparency 114. These regions of opacity 112 and regions of transparency 114 may be adjusted in location and in width. For example, the first parallax barrier 104 may have regions of transparency 114 that are thicker than the regions of opacity 112 and thus allow more of the display to be viewed through the first parallax barrier 104. At the same time, the second parallax barrier 106 may have regions of transparency that are thinner than the regions of opacity 112 and thus less of the display may be viewed through the second parallax barrier 106. The locations of the regions of opacity 112 may be changed thereby also altering the locations of the regions of transparency. By moving the regions of opacity 112 and regions of transparency 114, the first parallax barrier 104 and the second parallax barrier 106 may control how much and what portions of the display 102 may be seen by the first viewer 108 and the second viewer 110.

From the viewing position of the first viewer 108, a number of first viewing segments 116 of the display 102 may be viewable through the first parallax barrier 104 and the second parallax barrier 106. The first parallax barrier 104 and the second parallax barrier may be located and sized such that no portion of a number of second viewing segments 118 of the display 102 are visible to the first viewer 108 through the first parallax barrier 104 and the second parallax barrier 106. Conversely, from the viewing position of the second viewer 110, the number of second viewing segments 118 of the display 102 may be viewable through the first parallax barrier 104 and the second parallax barrier 106. The first parallax barrier 104 and the second parallax barrier may be located and sized such that no portion of the number of first viewing segments 116 of the display 102 are visible to the second viewer 110 through the first parallax barrier 104 and the second parallax barrier 106. Through this general arrangement, the display 102 may display two simultaneous images on the same display through the use of interleaving the images and through the position and size of the parallax barriers.

Using two parallax barriers rather than a split screen preserves the aspect ratio of original images and also allows for a larger functional dimension to be viewed by two viewers without increasing the size of the physical display itself. Further, in the example of using this display 102 in the context of a vehicle, the restriction of a passenger image from the driver allows a driver to better concentrate on a road as it reduce distracting imagery from the driver. In a similar way, the display 102 may interleave a single image and unpowered or darkened segments of the display 102. By interleaving with darkness on a display 102 combined with the use of at least one parallax barrier, it may be possible to display an image to one viewer, and for the display to appear off to a second viewer. Equipping a display 102 with two parallax barriers allows for the two segregated images to be substantially close to the original aspect ratio and limits the chances for the passenger's image to distract the driver.

One way of allowing modification of the regions of opacity 112 and regions of transparency 114 is by using adjustable parallax barriers. In an example, a parallax barrier can be a transparent LCD screen that allows areas to become opaque based on a signal received from a driver integrated circuit (IC). A driver IC may transmit signal to the parallax barriers based on a determined location of a viewer so that they adjustment of the regions of opacity 112 may ensure that the intended regions of the display 102 arrive at the correct viewer. In an example, the parallax barriers and the display may have a certain resolution. As the display is interleaving two images, each viewer may view half of the effective total screen resolution. Regions that are not shown to a viewer from a display due to a generated parallax barrier may appear dim. Accordingly, the thinner the slits and bands in the parallax barriers and on the display, the smaller the gap between regions a viewer may see. The shrinking of the different regions on the display 102 and the parallax barriers may increase the perceived quality of the image as it may be harder for a viewer to discern the thinner regions that are being blocked by the parallax barriers.

Figure 2:
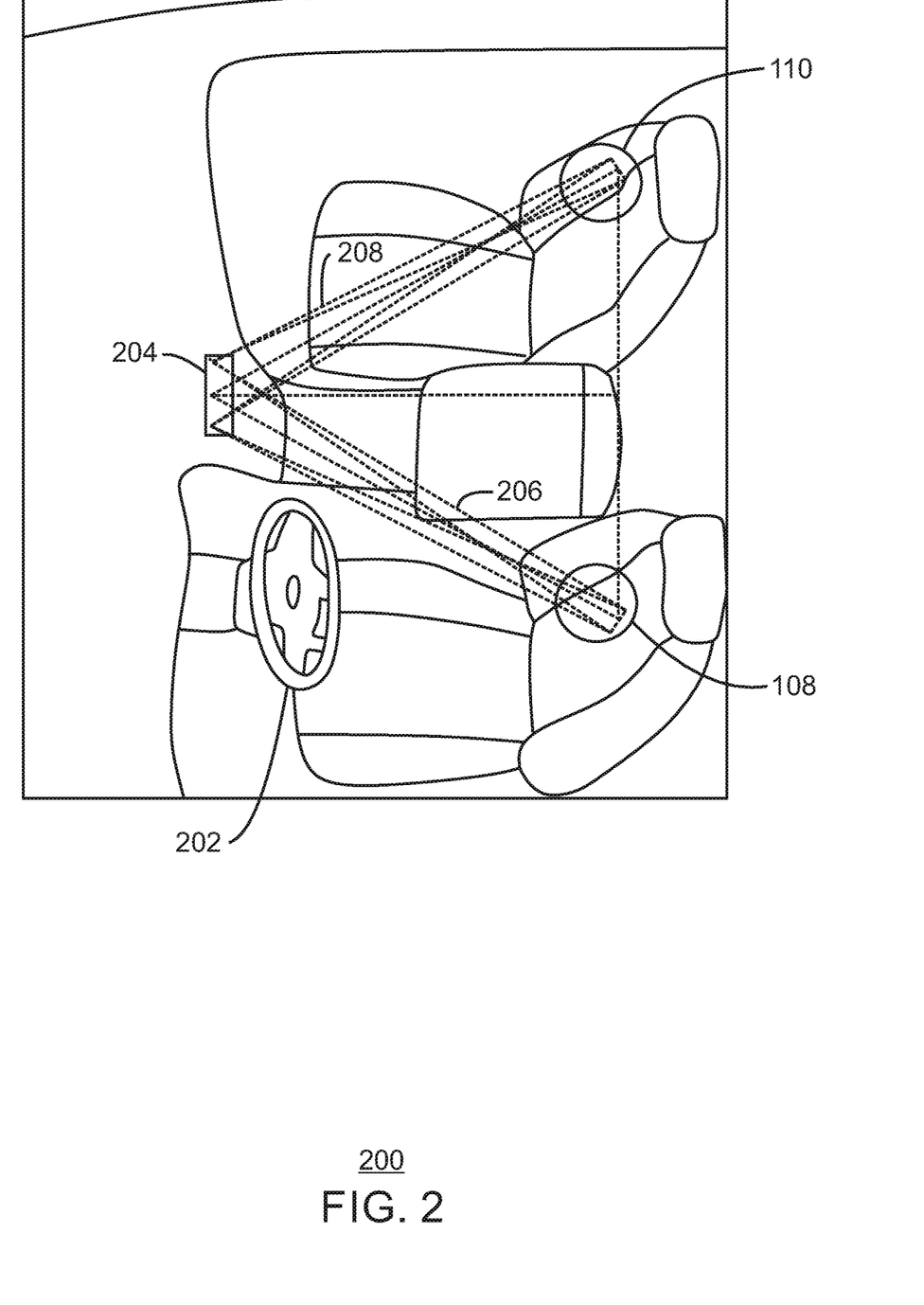
FIG. 2 is a drawing of an example top-down view of a vehicle with the display and parallax barriers.

FIG. 2 is a drawing of an example top-down view of a vehicle 200 with the display and parallax barriers. Like numbered images are as disclosed in FIG. 1. The vehicle may include a steering wheel 202 used by a first viewer 108 as a driver. The vehicle includes a mounted display 204 that may project multiple images through parallax barriers as described in FIG. 1.

The first viewer 108 may be able to see a first image on the mounted display 204 as the parallax barriers may be positioned and sized such that the first viewer 108 sees a first image most clearly in a first directed image path 206. The first directed image path 206 may be the path between the first viewer 108 and the mounted display 204. In the first directed image path 206 a first image is visible to the first viewer 108 while the second image is not visible to the first viewer 108 due to parallax barriers blocking parts of the mounted display 204. The angle of the first directed image path 206 may vary relative to a normal line extending from the mounted display 204 based on the location of the first viewer 108. A normal line is defined herein as the line that is perpendicular to a line parallel to the display screen surface.

The second viewer 110 may be able to see a second image on the mounted display 204 as the parallax barriers may be positioned and sized such that the second viewer 110 sees a second image most clearly in a second directed image path 208. The second directed image path 208 may be the path between the second viewer 110 and the mounted display 204. In the second directed image path 208 a second image is visible to the second viewer 110 while the first image is not visible to the second viewer 110 due to the parallax barriers blocking parts of the mounted display 204. The angle of the second directed image path 208 may vary relative to a normal line extending from the mounted display 204 based on the location of the second viewer 110.

As discussed above, the parallax barriers of the mounted display 204 may create an autostereoscopic display. In an example, two parallax barriers can be used to configure a single display such that it can simultaneously display two images to two different viewers so long as the viewers in two different places in the vehicle 200 are situated at different angles to the mounted display 204. The different locations of the viewers allows, in the vehicle context, for a driver and a passenger to view different images on a single mounted display 204. For example, the driver could be looking at a map while the passenger is viewing a movie, image, or other online content.

The mounted display 204 may also be a touchpanel, if an outermost layer enables touch sensing. In an example, an outermost layer of a mounted display may be a second parallax barrier. When a display is displaying two images at once in the same interleaved spaced, a touch interaction on the touchpanel could interact with control spaces indicated by images. A sensor could be added to the mounted display 204 to determine which user is interacting with the mounted display 204 and therefore which image should accept and act on the touch interaction. For example, if the first viewer 108 were viewing the mounted display, the first directed image path 206 would show the first viewer 108 the first image. In response to a detection that the first viewer 108 is reaching towards the screen and a touch interaction is detected, then the mounted display 204 may signal that the controls associated with the first image should act based on the detected interaction. One way to detect if the first viewer 108 or the second viewer is reaching towards the mounted display 204 is through a motion or proximity detector mounted on each side of the mounted display 204. In an example, the motion detection may be a passive infrared sensor (PIR sensor). If a motion or proximity detector on a first viewer 108 side detects a proximate object or an object approaching the mounted display 204 on a first viewer 108 side, then a touch interaction may have an effect limited to the first image that the first viewer 108 may be observing. Likewise a second motion or proximity detector mounted on a second viewer 110 side may allow a touch interaction to be attributed to a second viewer 110 and handled assuming the interaction was intended for controlling and interacting with the second display. A motion or proximity detector are a couple examples of sensors, and other sensors could be used including face and body recognition and tracking, presence sensing through weight detection in seats, heat signatures, detected air composition such as $CO_2$ levels, and may employ technologies including infrared detectors and other light wave sensors.

Figure 3:
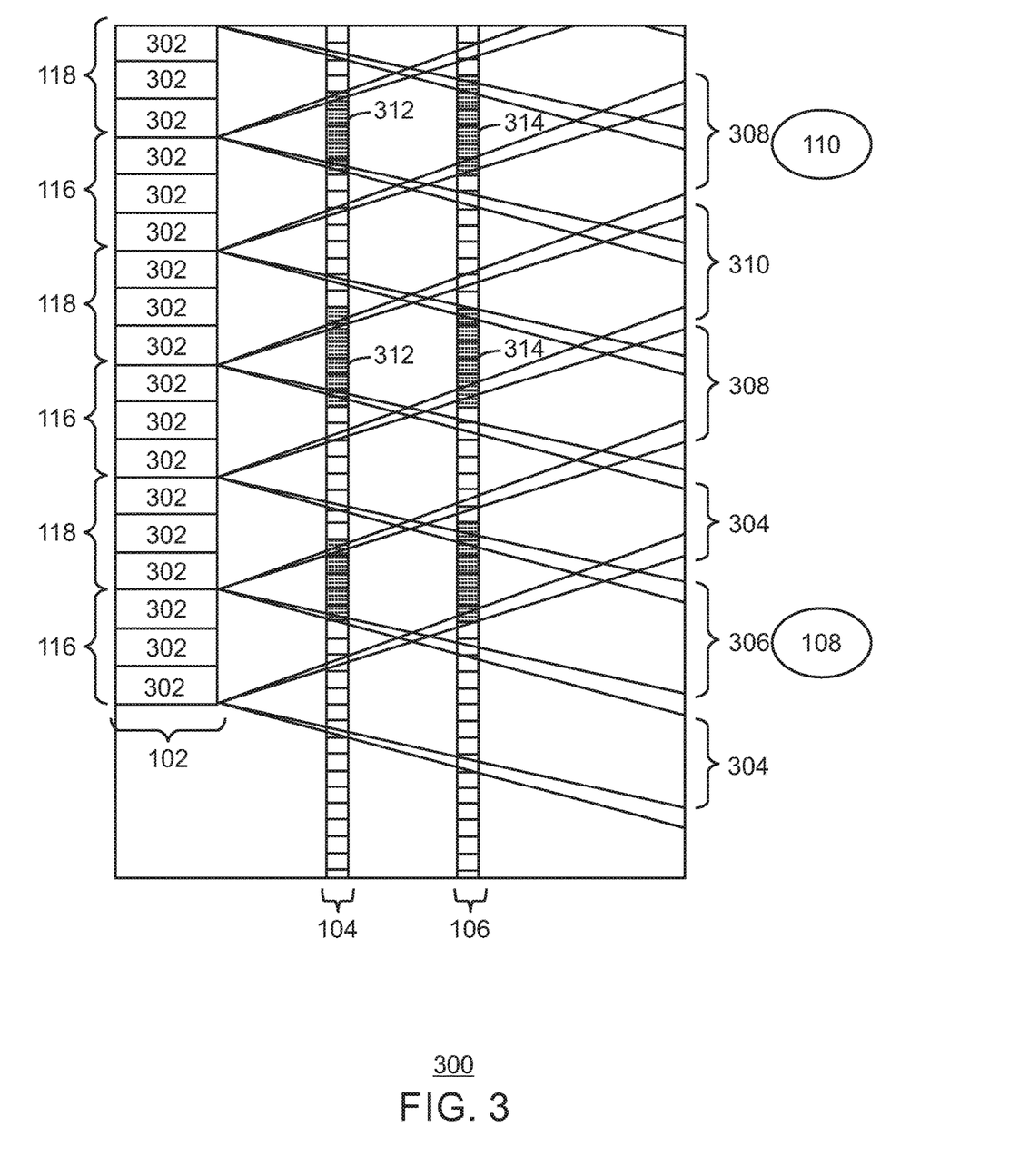
FIG. 3 is a drawing of an example default arrangement of the display and parallax barriers.

FIG. 3 is a drawing of an example default arrangement 300 of the display and parallax barriers. Like numbered items are as described in FIG. 1.

As discussed above, the display 102 may include first viewing segments 116 viewable by a first viewer 108 and second viewing segments viewable by a second viewer 110. The two images may be interleaved based on the size of the first viewing segments 116 and the second viewing segments 118 because these are the portions of the display 102 that may be alternated while being displayed to the viewers. The first viewing segment 116 and the second viewing segment 118 include a number of pixels 302 that may be used to display the images of the display 102.

As seen in FIG. 3, a set of three pixels 302 making up a first viewing segment 116 may be seen by the first viewer 108 and another set of three pixels 302 making up a second viewing segment 118 may be seen by the second viewer 110. The aiming and guiding of these viewing segments is accomplished through the use of the first parallax barrier 104 and the second parallax barrier 106.

The parallax barriers may be transparent screens with regions that when activated become opaque. For example, the parallax barrier may be a transparent LCD with regions of displayed opacity based on the signal output by a driver IC. The signal indicating where regions of opacity may be displayed along the first parallax barrier may indicate a width or size of the region to become opaque along the parallax barrier. The first parallax barrier 104 may include a first number of parallax barrier lines 312 which are sized and located based on the location of the first viewer 108 and the second viewer 110. The first number of parallax barrier lines 312 may be controllable opaque regions along the first parallax barrier 104. The second parallax barrier 106 may include a second number of parallax barrier lines 314 which are sized and located based on the location of the first viewer 108 and the second viewer 110.

The parallax barrier lines in the first parallax barrier 104 and the second parallax barrier 106 can be controlled in concert with one another to aim the two interleaved images to the first viewer 108 and second viewer 110, respectively. For example, the first parallax barrier 104 may receive instructions from a coordinated signal to block a side of a first viewing segment 116 closest to the second viewer 110 with the first number of parallax barrier lines 312, while the second parallax barrier 106 receive instructions from a coordinated signal to block a side of a first viewing segment 116 furthest from the second viewer 110 with the second number of parallax barrier lines 314. In this way, the first parallax barrier 104 and the second parallax barrier 106 work in concert to completely block the first image from the second viewer 110. At the same time, this orientation ensures the first viewer 108 is blocked from seeing the second image as displayed in the second viewing segments 118. Shown in FIG. 3, the first parallax barrier 104 may block a side of the second viewing segment 118 closest to a first viewer 108 using the first number of parallax barrier lines 312 while the second parallax barrier 106 may block from the first viewer 108 a side of the second viewing segment 118 furthest from the first viewer 108 using the second number of parallax barrier lines 314.

Figure 4:
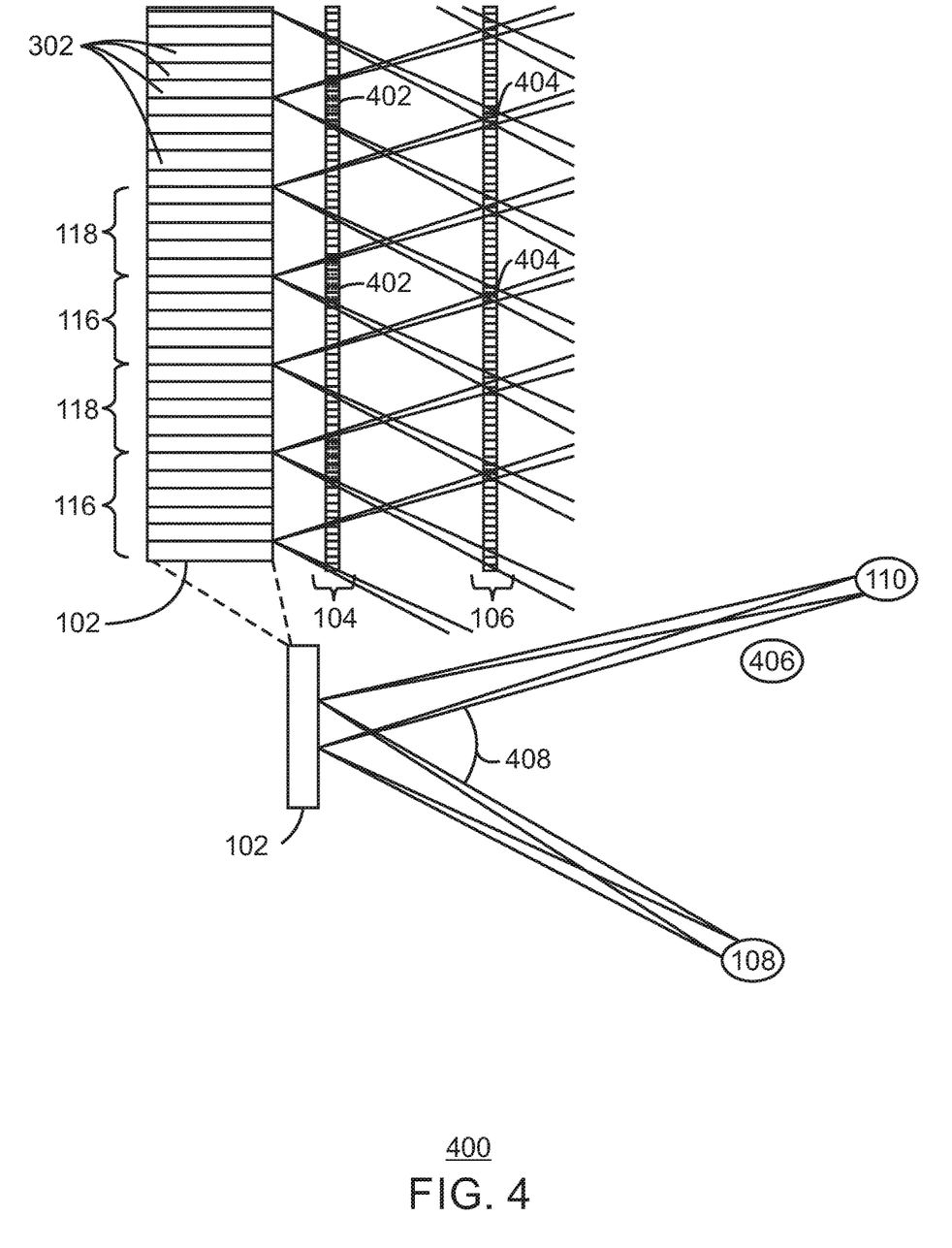
FIG. 4 is a drawing of an example passenger angled arrangement of the display and parallax barriers.

FIG. 4 is a drawing of an example passenger angled arrangement 400 of the display 102 and parallax barriers. Like numbered items are as described with respect to FIG. 1 and FIG. 3.

Although other contexts are considered, the vehicle context is shown here in close up view of the display 102 as well as a view that shows the first viewer 108 and the second viewer 110 as a passenger relative to the display 102.

The adjusted first number of parallax barrier lines 402 on the first parallax barrier 104 and the adjusted second number of parallax barrier lines 404 on the second parallax barrier 106 are shown in FIG. 4. The location and thickness of these parallax barrier lines is adjusted based on the locations of the first viewer 108 and the second viewer 110. In an example, the second viewer 110 may be a passenger and as shown may have moved around in the vehicle thereby changing the second viewer distance and angle from the display 102. As the angle and location of a viewer affects the image that can be seen the display and parallax barriers may adjust themselves to account for the movement of a viewer. As seen in FIG. 4, the adjusted second number of parallax barrier lines 404 are small relative to a second number of parallax barrier lines 314 seen in FIG. 3. The adjustment of the location and width of the second number of parallax barrier lines 314 responds to a detection of a second viewer 110 location. A detection of the second viewer 110 location may be from a sensor such as a facial recognition system that adjusts the position of an LCD controlled parallax barriers in order to "aim" the image to the new location of the passenger.

By adjusting the location and the width of parallax barrier lines, the distance 406 and the angle 408 for viewing of the second image by the second viewer 110 in an adjusted location may be obtained. In an example, the adjusted distance 406 from the display 102 may be measured in order to calculate an angle 408 from a normal line of a display. This angle may be used to adjust the parallax barriers in width and location.

In the context of a vehicle, the use of two parallax barriers allows the display 102 to compensate for the large range of possible driver and passenger head locations. In an example, a single parallax barrier could be used if the driver and passenger head locations were restricted to the same angle from a normal line extending from the display 102. Further, beyond use of two parallax barriers, additional barriers could be used to increase the functional range of the system by reducing the over elimination of portions of the display by effectively increasing the resolution of the barrier screens.

Figure 5:
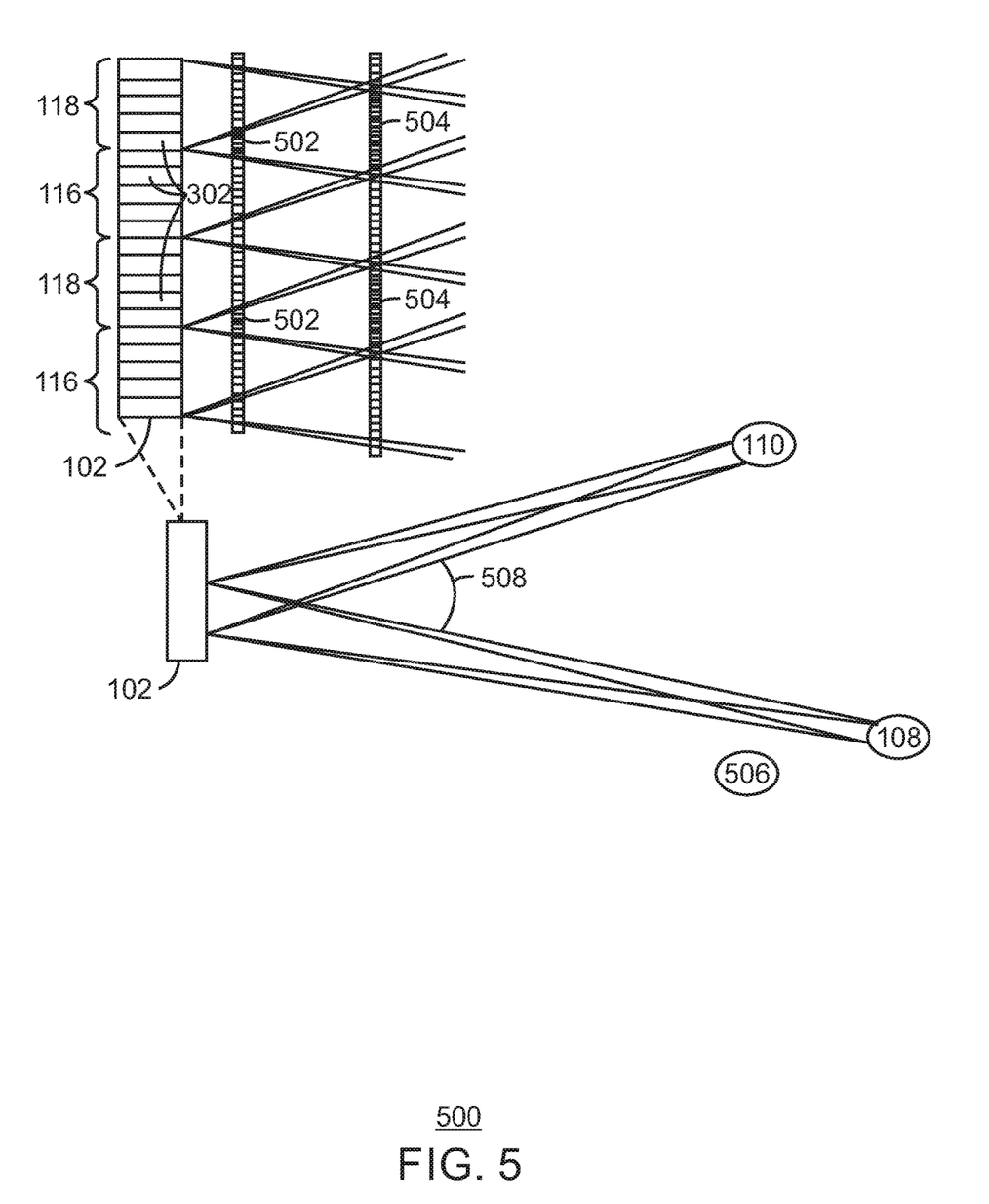
FIG. 5 is a drawing of an example driver angled arrangement of the display and parallax barriers.

FIG. 5 is a drawing of an example driver angled arrangement 500 of the display and parallax barriers. Like numbered items are as described with respect to FIG. 1 and FIG. 3.

A driver or first viewer 108 may move their head while a second viewer 110 remains stationary. Rather than remove visibility of the display for the first viewer 108 driver or second viewer 110 passenger, the display and parallax barriers may shift and adjust in width in order to accommodate a single viewer moving while another remains in location. Further, the display 102 and parallax barriers may adjust when a number of viewers are moving in their own directions in an intended viewable area if at least two parallax barriers are used. In FIG. 5, the modified first number of parallax barrier lines 502 have modified their location and width relative to the first number of parallax barrier lines 314 seen in FIG. 3. The modified second number of parallax barrier lines 504 have increased in width and modified location 506 relative to the second number of parallax barrier lines 316. Based on a measured location of a viewer, an angle of viewability 508 from the display 102 can be calculated. An increase or decrease in width by the parallax barrier lines can correspond to the interleaving of a first image and a second image on the display 102 in order to adjust the angle of viewability 508 of the first image to the first viewer 108 such that the first viewer 108 cannot see the second image of the display 102. Determining the location of the first viewer 108 or the second viewer 110 may involve a sensor such as an eye tracking system to determine the angle of viewability 508 between the display and an intended viewers' eyes in order to adjust the alignment of the parallax barriers.

In an example, a first viewer 108 may be present and a second viewer 110 not present. While one or another viewer may not be present, a viewer may decide they prefer a single image is displayed, not two simultaneous images. In these cases, a viewer may interact with the display or another control mechanism to convey a signal that deactivates the parallax barriers to restore normal viewing options. Deactivation of the parallax barrier can include removing opaque regions such as parallax barrier lines. In an example, a detection of one viewer being present may lead to an automatically sent signal to switch to a single image mode. Conversely, if a second viewer joins an intended field of vision while the display is in a single image mode, the parallax barriers may automatically enable parallax barriers and a multi-image mode to present the second viewer with their own image without interrupting a first viewer from viewing a first image on the same display 102.

Figure 6:
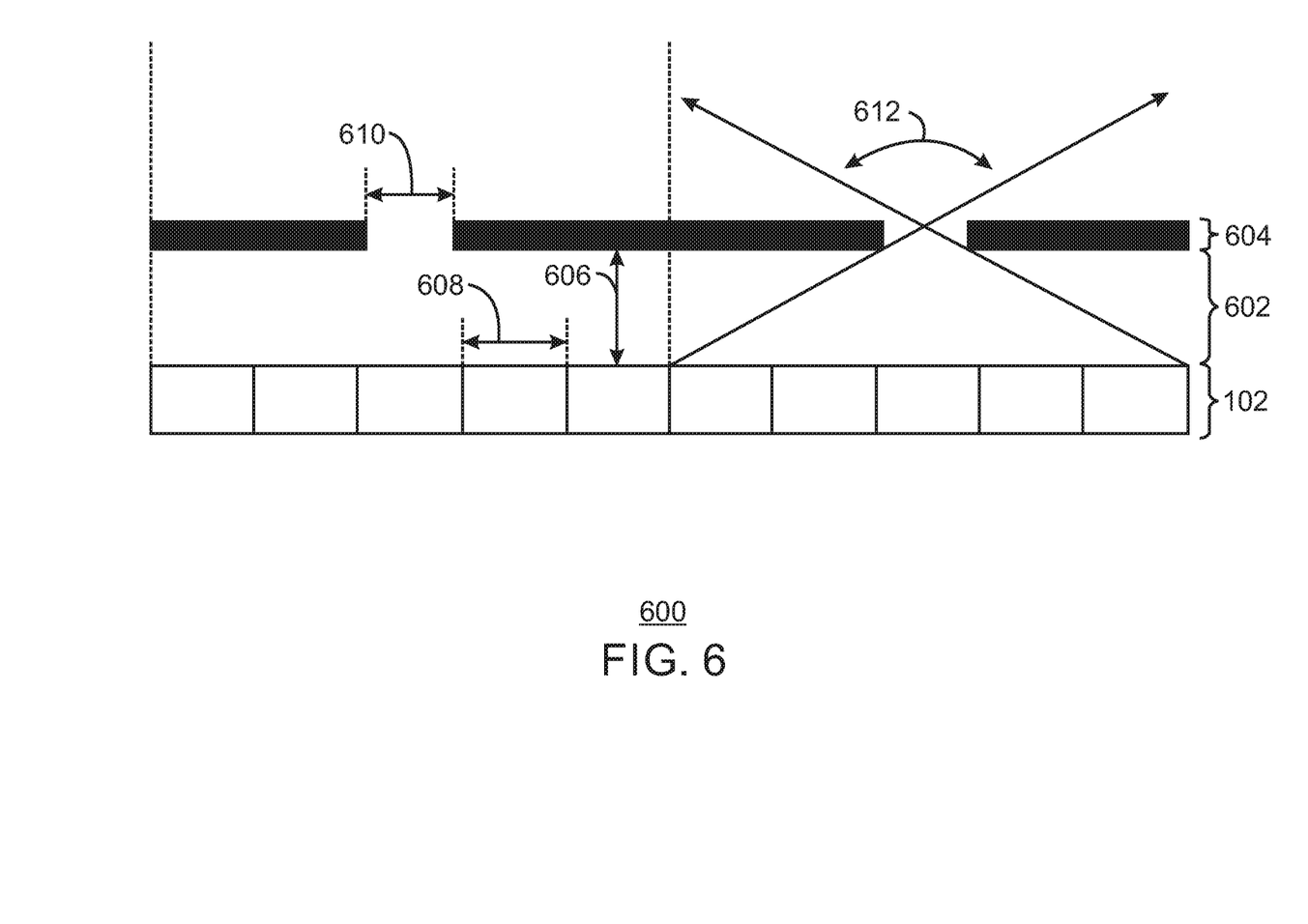
FIG. 6 is a drawing of an example diagram of the side view of a device with the display and a generated pinhole mask.

FIG. 6 is a drawing of an example diagram of the side view of a device 600 with the display and a pinhole mask. Like numbered items are as described with respect to FIG. 1.

While the parallax barriers described above may accommodate a first and second viewer at various angles, a third image may be interleaved in the display for a third viewer positioned along a normal line extending from the display 102 through the use of a "pinhole" arrangement. The pinhole arrangement may be accomplished through a physical pinhole mask or through the movement of the parallax barriers such that a pinhole arrangement is effectively formed. The pinhole arrangement shown in FIG. 6 continues to allow diagonal viewing of first image and a second image by a first and second viewer positioned to various sides of the display 102 while neither sees a region directly below the pinhole opening in the pinhole mask.

The display may include spacing and display protection through the use of a spacer 602, for example, an acrylic spacer. The pinhole arrangement may include a pinhole mask 604 separated from the display by the spacer 602 by a spacer distance 606 where a pinhole display region length 608 of a pixel displaying a third image may be viewed through a pinhole 610 that is equal to or slightly smaller in size than the pinhole display region length 608. The smaller size ensures that a first or second image is not viewed from a position along the normal line from the display.

The pinhole mask 604 may be created as an effective pinhole mask that is not always present but instead created by moving parallax barriers or by moving opaque regions of parallax barrier lines on a parallax barrier. When viewing a display implementing a pinhole mask there may be no region of a third image viewable to a viewer looking at the display at an angle beyond a viewable pinhole angle 612. In an example, the viewable pinhole angle may be greater than 20 degrees beyond the normal of the display 102, greater than 15 degrees beyond the normal of the display, or greater than 5 degrees beyond the normal of the display. A third viewer positioned directly opposite the display 102, on the side of the display's intended viewing area, may be shown a third interleaved segment of a third picture. This display of the segment of the third picture may occur on pixels directly in line with the pinhole of the opaque pinhole mask 604.

The use of a pinhole mask 604 or effective pinhole mask may display a third interleaved image for a third viewer. An example for using a pinhole mask includes the use by a third viewer located in the backseat of a car with the display with active parallax barriers. Pinholes arrangements can be created for a single viewer or a number of viewers by adding additional pinholes and ensuring the viewable pinhole angle 612 directs the interleaved image of the display 102 to the intended viewer.

Figure 7:
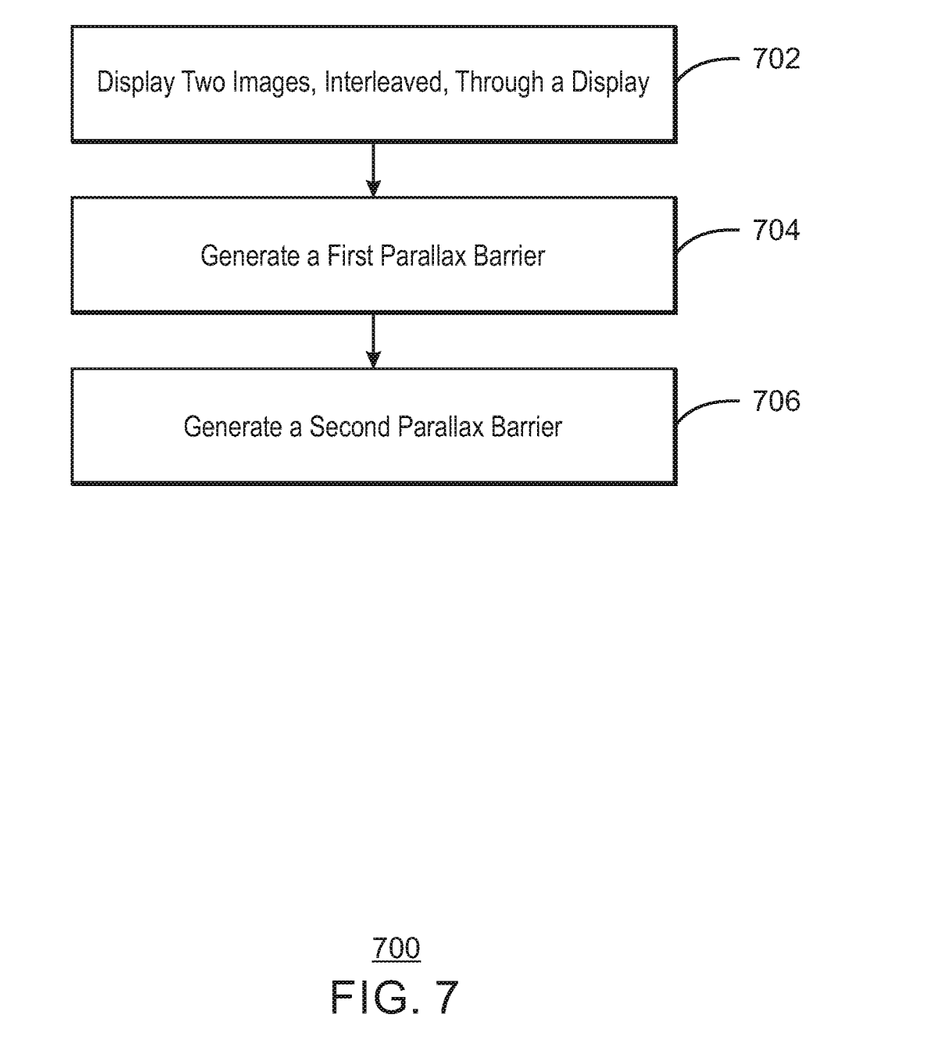
FIG. 7 is a process flow diagram of an example method for the display of multiple images on the same display with parallax barriers.

FIG. 7 is a process flow diagram of an example method 700 for the display of multiple images on the same display with parallax barriers. At block 702, the method 700 displays two images interleaved through a display including a vertical axis parallel to a line passing from the center-bottom of the display and the center-top of the display.

At block 704, the method 700 generates a first parallax barrier located between the display and an intended viewable area, where the first parallax barrier includes a first number of parallax barrier lines, where the first number of parallax barrier lines are opaque and parallel to the vertical axis. At block 706, the method 700 generates a second portion of the display with a second parallax barrier located between the first parallax barrier and the intended viewable area, where the second parallax barrier includes a second number of parallax barrier lines, where the second number of parallax barrier lines are opaque and parallel to the vertical axis. In an example, the first number of parallax barrier lines and the second number of parallax barrier lines can be modified based on the first viewer location.

Modification of parallax barrier lines can include modification of line width or modified in terms of parallax barrier line location. Further, the sensor is to detect a second viewer location corresponding to a second viewer in the intended viewable area. The first number of parallax barrier lines and the second number of parallax barrier lines are modified based on the first viewer location and the second viewer location. In an example, the sensor may be an eye detector or a face detector used to identify a location of a viewer. The location of a viewer can include an updated or particular angle relative to the display and another viewer. The location of a viewer can include a distance from a display. The location may also vary relative to an original or default position of a viewer.

Based on the location identified by the sensor, the parallax barriers may adjust the location and width of the parallax barrier lines in the first and second parallax barriers in order to allow the viewer to still view the image of the multiple images on the display that is intended for them. Similarly, this adjustment based on a sensor tracking the movements of a viewer, such as a first viewer, the sensor may also track the location of a second viewer and result in the adjustment of the parallax barrier lines in width and location to allow viewing by a second viewer as well.

Further, a sensor that is an eye location detector may be used to adjust the parallax barrier lines to correspond the width of the barrier stripes to the width of the interleaved pixel, images shown on the display. In another example, the inverse relationship between the width of the parallax barrier lines in the first parallax barrier and the width of the parallax barrier lines in the second parallax barrier may be preserved by ensuring that the sum of a first-barrier line width and a second-barrier line width remains constant between a first configuration and a second configuration where the first-barrier line width varies between the first configuration and the second configuration. Specifically, there would be a one-to-one relationship between the width increase in one parallax barrier and the width decrease in the other parallax barrier. Other mathematical relationships may correlate the width of the opaque lines in the first parallax barrier and the opaque lines in the second parallax barrier, including a Hooke's law and others.

The second parallax barrier can feature a touchpanel as it may be the outermost surface facing the passenger and the driver. As such, the second parallax barrier can be a touchpanel while the first parallax barrier between the second parallax screen and the display may not be a touchpanel as that barrier is not exposed to a viewer. In an example, a motion sensor being used may be an infrared sensor. Use of a motion sensor may allow a determination that a touch may be coming from a particular direction or viewer based on which side of the display a proximate object is detected by the motion sensor.

With regard to determining line width of the lines shown on the parallax barriers, the first-barrier line width of the opaque lines in first number of parallax barrier lines can vary inversely relative to a second-barrier line width of the opaque lines in the second number of parallax barrier lines. In this example, the larger the line width of the first parallax barrier may be smaller than the smaller the line width of the second parallax barrier. To accomplish this adjustment, the width of the first parallax barrier lines may increase while the second parallax barrier lines may decrease in width, simultaneously. This inverse relationship may be present when the display is adjusting the target location for displaying a first and a second image through the parallax barriers.

The first parallax barrier and the second parallax barrier may be transparent digital displays that may turn off the first number of parallax barrier lines and the second number of parallax barrier lines to increase a potential to switch back and forth between a single image display and a multi-image display. Switching to a single image display without displaying parallax barrier lines may increase the functionality of the display so that there are several modes, including a multi-image display mode and a single image display mode. In the case where a display is displaying a single image, the display would no longer be interleaving an image as the parallax barrier lines would be removed. Thus, in response to a signal, perhaps generated by the viewer, or based on a detection that one occupant is in the vehicle using a proximity, weight, or pressure sensor, then the display should been seen without parallax barriers.

The method 700 may further transmit, with a driver integrated circuit, signals to the first parallax barrier and second parallax barrier to modify the location and width of the first number of parallax barrier lines and the second number of the parallax barrier lines. In an example, the method 700 can detect, with a sensor, a first viewer location corresponding to a first viewer in the intended viewable area. The method 700 can include detecting, with a motion sensor located to the side of the display, if a touch experienced at the second parallax barrier originated from the same side of the display as the motion sensor. A detection that the motion sensor to a certain side of a display detects a proximate object during a touchpanel interaction, such as a touch, suggests that the viewer on that side, and viewing that screen is the viewer that intended that interaction. As such, even if a touchpanel interaction includes surface area that is displaying two different interactive elements through interleaving of images being displayed, the interactive element that will be affected is the one viewable to the viewer on the side of the screen that the proximate detection was made by a motion sensor or other similar sensor detection. As discussed above, the motion detector may be an infrared detector used to identify which side of the display, and correspondingly which viewer, may be interacting with the screen due to their motion past the sensor.

Figure 8:
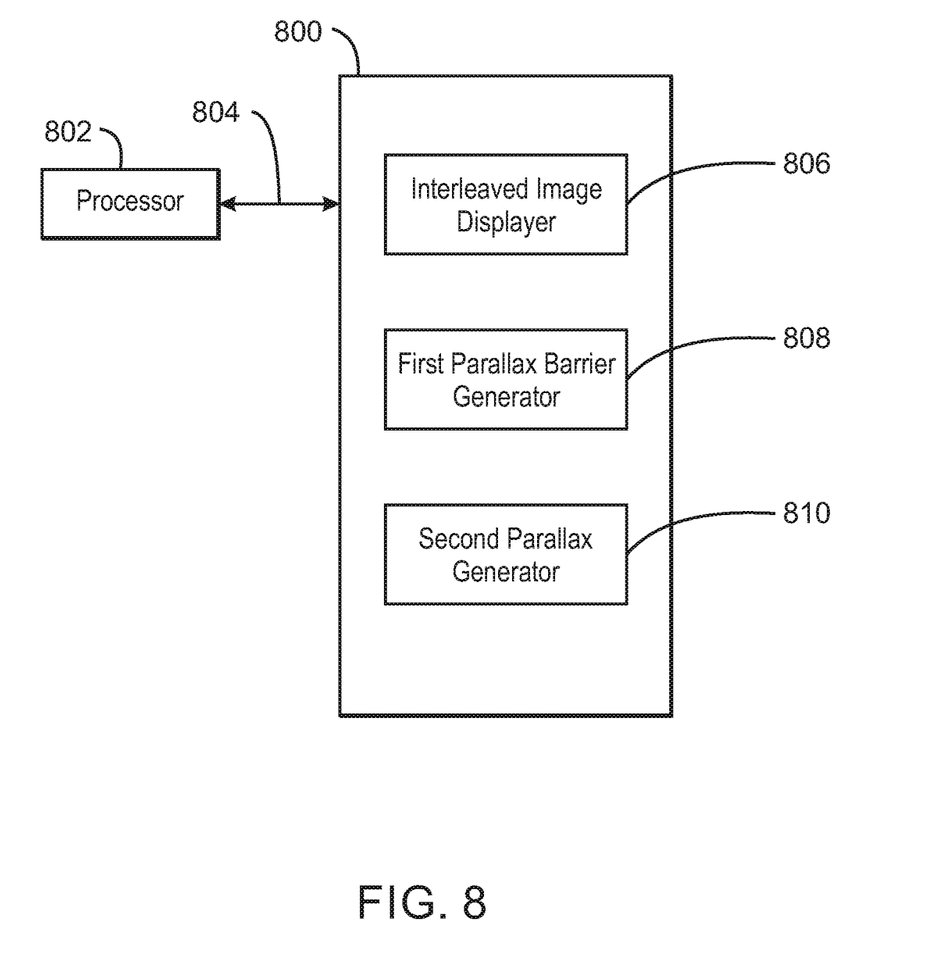
FIG. 8 is a drawing of an example computer-readable medium storing instructions, that when executed on a processor display of multiple images on the same display with parallax barriers.

FIG. 8 is a drawing of an example computer-readable medium 800 storing instructions, that when executed on a processor display of multiple images on the same display with parallax barriers. The tangible, non-transitory, computer-readable medium 800 includes instructions that, when executed by a processor 802 can direct the processor 802 through a bus 804 to test state machine software.

The computer-readable medium 800 includes an interleaved image displayer 806 to present two images interleaved through a display including a vertical axis parallel to a line passing from the center-bottom of the display and the center-top of the display. The computer-readable medium 800 includes, a first parallax barrier generator 808 to generate a first parallax barrier located between the display and an intended viewable area, where the first parallax barrier includes a first number of parallax barrier lines, where the first number of parallax barrier lines are opaque and parallel to the vertical axis.

The computer-readable medium 800 includes a second parallax barrier display generator 810 to generate a second parallax barrier located between the first parallax barrier and the intended viewable area, where the second parallax barrier includes a second number of parallax barrier lines, where the second number of parallax barrier lines are opaque and parallel to the vertical axis. In an example, the first number of parallax barrier lines and the second number of parallax barrier lines can be modified based on the first viewer location. Modification of parallax barrier lines can include modification of line width or line location. Further, the sensor is to detect a second viewer location corresponding to a second viewer in the intended viewable area. The first number of parallax barrier lines and the second number of parallax barrier lines are modified based on the first viewer location and the second viewer location. In an example, the sensor may be an eye detector or a face detector used to identify a location of a viewer. The location of a viewer can include an updated or particular angle relative to the display and another viewer. The location of a viewer can include a distance from display. The location may also vary relative to an original or default position of a viewer. Based on the location identified by the sensor, the parallax barriers may adjust the location and width of the parallax barrier lines in the first and second parallax barriers in order to allow the viewer to still view the image of the multiple images on the display that is intended for them. Similarly, this adjustment based on a sensor tracking the movements of a viewer, such as a first viewer, the sensor may also track the location of a second viewer and result in the adjustment of the parallax barrier lines in width and location to allow viewing by a second viewer as well. Further, a sensor that is an eye location detector may be used to adjust the parallax barrier lines to correspond the width of the barrier stripes to the width of the interleaved pixel images shown on the display.

The second parallax barrier can feature a touchpanel as it may be the outermost surface facing the passenger and the driver. As such, the second parallax barrier can be a touchpanel while the first parallax barrier between the second parallax screen and the display may not be a touchpanel as that barrier is not exposed to a viewer. In an example, a motion sensor being used may be an infrared sensor. Use of a motion sensor may allow a determination that a touch may be coming from a particular direction or viewer based on which side of the display a proximate object is detected by moving past the motion detector.

With regard to determining line width of the lines shown on the parallax barriers, the first-barrier line width of the opaque lines in first number of parallax barrier lines can vary inversely relative to a second-barrier line width of the opaque lines in the second number of parallax barrier lines. In this example, the larger the line width of the first parallax barrier, the smaller the line width of the second parallax barrier. To accomplish this adjustment, the first parallax barrier and the second parallax hairier may be digital displays that may turn off the first number of parallax barrier lines and the second number of parallax barrier lines to increase a potential to switch back and forth between a single image display and a multi-image display. Switching to a single image display without displaying parallax barrier lines may increase the functionality of the display so that there are several modes, including a multi-image display mode and a single image display mode. In the case where a display is displaying a single image, the display would no longer be interleaving an image as the parallax barrier lines would be removed. Thus, in response to a signal, perhaps generated by the viewer, or based on a detection that one occupant is in the vehicle using a motion, proximity, weight, or pressure sensor, then the display should been seen without parallax barriers.

What is claimed is:

1. A device for displaying multiple images, comprising:
   a display to present two images interleaved, wherein the display comprises a vertical axis parallel to a line passing through a center-bottom of the display and a center-top of the display;
   a first parallax barrier placed between the display and an intended viewable area, wherein the first parallax barrier comprises a first plurality of parallax barrier lines, wherein the first plurality of parallax barrier lines are opaque and parallel to the vertical axis; and
   a second parallax barrier placed between the first parallax barrier and the intended viewable area, wherein the second parallax barrier comprises a second plurality of parallax barrier lines, wherein the second plurality of parallax barrier lines are opaque and parallel to the vertical axis, wherein a first-barrier line width of the opaque lines in first plurality of parallax barrier lines varies inversely relative to a second-barrier line width of the opaque lines in the second plurality of parallax barrier lines.

2. The device of claim 1, comprising a driver integrated circuit to transmit signals to the first parallax barrier and second parallax barrier which each respectively modify the first plurality of parallax barrier lines and the second plurality of the parallax barrier lines by location and width.

3. The device of claim 1, comprising a sensor to detect a first viewer location corresponding to a first viewer in the intended viewable area.

4. The device of claim 3, wherein the first plurality of parallax barrier lines and the second plurality of parallax barrier lines are modified based on the first viewer location.

5. The device of claim 3, wherein:
   the sensor is to detect a second viewer location corresponding to a second viewer in the intended viewable area; and wherein
   the first plurality of parallax barrier lines and the second plurality of parallax barrier lines are modified based on the first viewer location and the second viewer location.

6. The device of claim 1, wherein the second parallax barrier is a touchpanel.

7. The device of claim 6, comprising a motion sensor located to a side of the display to detect if a touch experienced at the second parallax barrier originated from the same side of the display as a motion sensor.

8. The device of claim 1, wherein the first parallax barrier and the second parallax barrier are transparent digital displays that turn off the first plurality of parallax barrier lines and the second plurality of parallax barrier lines in response to a detection of a turn off signal.

9. The device of claim 1, wherein a sum of the first-barrier line width and the second-barrier line width remains constant between a first configuration and a second configuration wherein the first-barrier line width varies between the first configuration and the second configuration.

10. A method for displaying multiple images on a single display, comprising:
    displaying two images interleaved through a display comprising a vertical axis parallel to a line passing from a center-bottom of the display and a center-top of the display;
    generating a first parallax barrier located between the display and an intended viewable area, wherein the first parallax barrier comprises a first plurality of parallax barrier lines, wherein the first plurality of parallax barrier lines are opaque and parallel to the vertical axis; and
    generating a second parallax barrier located between the first parallax barrier and the intended viewable area, wherein the second parallax barrier comprises a second plurality of parallax barrier lines, wherein the second plurality of parallax barrier lines are opaque and parallel to the vertical axis, wherein a first-barrier line width of the opaque lines in first plurality of parallax barrier lines varies inversely relative to a second-barrier line width of the opaque lines in the second plurality of parallax barrier lines.

11. The method of claim 10, comprising transmitting, with a driver integrated circuit, signals to the first parallax barrier and second parallax barrier to modify the location and width of the first plurality of parallax barrier lines and the second plurality of the parallax barrier lines.

12. The method of claim 10, comprising detecting, with a sensor, a first viewer location corresponding to a first viewer in the intended viewable area.

13. The method of claim 12, wherein the first plurality of parallax barrier lines and the second plurality of parallax barrier lines are modified based on the first viewer location.

14. The method of claim 12, wherein:
    the sensor is to detect a second viewer location corresponding to a second viewer in the intended viewable area; and wherein
    the first plurality of parallax barrier lines and the second plurality of parallax barrier lines are modified based on the first viewer location and the second viewer location.

15. The method of claim 10, wherein the second parallax barrier is a touchpanel.

16. The method of claim 15, comprising detecting, with a motion sensor located to a side of the display, if a touch experienced at the second parallax barrier originated from the same side of the display as the motion sensor.

17. The method of claim 10, wherein the first parallax barrier and the second parallax barrier are digital displays that turn off the first plurality of parallax barrier lines and the second plurality of parallax barrier lines in response to detection of a turn off signal.

18. The method of claim 10, wherein a sum of the first-barrier line width and the second-barrier line width remains constant between a first configuration and a second configuration wherein the first-barrier line width varies between the first configuration and the second configuration.

19. A tangible, non-transitory, computer-readable medium comprising instructions that, when executed by a processor, display multiple images on a single display, the instructions to direct the processor to:
- present two images interleaved through a display comprising a vertical axis parallel to a line passing from a center-bottom of the display and a center-top of the display;
- block a portion of the display with a first parallax barrier located between the display and an intended viewable area, wherein the first parallax barrier comprises a first plurality of parallax barrier lines, wherein the first plurality of parallax barrier lines are opaque and parallel to the vertical axis; and
- block a second portion of the display with a second parallax barrier located between the first parallax barrier and the intended viewable area, wherein the second parallax barrier comprises a second plurality of parallax barrier lines, wherein the second plurality of parallax barrier lines are opaque and parallel to the vertical axis, wherein a first-barrier line width of the opaque lines in first plurality of parallax barrier lines varies inversely relative to a second-barrier line width of the opaque lines in the second plurality of parallax barrier lines.

20. The computer-readable medium of claim 19, comprising instructions that when executed, cause the processor to transmit, with a driver integrated circuit, signals to the first parallax barrier and second parallax barrier to modify the location and width of the first plurality of parallax barrier lines and the second plurality of the parallax barrier lines.

21. The computer-readable medium of claim 19, comprising instructions that when executed, cause the processor to detect, with a sensor, a first viewer location corresponding to a first viewer in the intended viewable area.

22. The computer-readable medium of claim 21, wherein the first plurality of parallax barrier lines and the second plurality of parallax barrier lines are modified based on the first viewer location.

23. The computer-readable medium of claim 21, wherein:
- the sensor is to detect a second viewer location corresponding to a second viewer in the intended viewable area; and wherein
- the first plurality of parallax barrier lines and the second plurality of parallax barrier lines are modified based on the first viewer location and the second viewer location.

24. The computer-readable medium of claim 19, wherein the second parallax barrier is a touchpanel.

25. The computer-readable medium of claim 24, comprising instructions that when executed, cause the processor to detect, with a motion sensor located to a side of the display, if a touch experienced at the second parallax barrier originated from the same side of the display as the motion sensor.

26. The computer-readable medium of claim 19, wherein the first parallax barrier and the second parallax barrier are digital displays that turn off the first plurality of parallax barrier lines and the second plurality of parallax barrier lines in response to the detection of a turn off signal.

27. The computer-readable medium of claim 19, wherein a sum of the first-barrier line width and the second-barrier line width remains constant between a first configuration and a second configuration wherein the first-barrier line width varies between the first configuration and the second configuration.

* * * * *